(12) United States Patent
Akimoto et al.

(10) Patent No.: US 7,209,591 B2
(45) Date of Patent: Apr. 24, 2007

(54) MOTION COMPENSATION METHOD FOR VIDEO SEQUENCE ENCODING IN LOW BIT RATE SYSTEMS

(75) Inventors: Hiroshi Akimoto, Kawasaki (JP); Oleksandr V. Monastyrskyi, Kawasaki (JP)

(73) Assignee: Institue of Super Compression Technologies, Kawasaki (JP)

(*) Notice: Subject to any disclaimer, the term of this patent is extended or adjusted under 35 U.S.C. 154(b) by 751 days.

(21) Appl. No.: 10/620,879

(22) Filed: Jul. 15, 2003

(65) Prior Publication Data
US 2005/0283713 A1 Dec. 22, 2005

Related U.S. Application Data

(60) Provisional application No. 60/396,331, filed on Jul. 16, 2002.

(51) Int. Cl.
G06K 9/36 (2006.01)
H04N 5/228 (2006.01)
H04B 1/66 (2006.01)

(52) U.S. Cl. .............. 382/238; 348/208.4; 357/240.12

(58) Field of Classification Search ............... 382/232, 382/233, 236, 238, 245, 250, 251, 309; 348/27, 348/154, 208.4, 407.1; 375/240.03, 240.12, 375/240.16, 240.2, 240.23; 714/764, 766
See application file for complete search history.

(56) References Cited

U.S. PATENT DOCUMENTS

| | | | | |
|---|---|---|---|---|
| 5,504,530 | A * | 4/1996 | Obikane et al. ....... | 375/240.14 |
| 5,748,789 | A * | 5/1998 | Lee et al. .................. | 382/243 |
| 6,697,930 | B2 * | 2/2004 | Wise et al. .................... | 712/2 |
| 6,810,081 | B2 | 10/2004 | Dantwala ............... | 375/240.16 |
| 6,853,682 | B2 | 3/2005 | Min ..................... | 375/240.19 |
| 6,871,006 | B1 * | 3/2005 | Oguz et al. .................. | 386/68 |
| 7,023,924 | B1 * | 4/2006 | Keller et al. .......... | 375/240.26 |

OTHER PUBLICATIONS

"Generic Coding of Moving Pictures and Associated Audio Information: Video", ISO/IEC, 1995.
"Overview of the MPEG-4 Standard," ISO/IEC JTCI/SC29/WG11 N4668, Mar. 2002.
Image and Video Compression Standards: Algorithms and Architectures. Author: B. Vasudev, K. Konstantinos (Kluwer Academic Publishers, Second Edition, 1999).
Algorithms, Complexity Analysis and VLSI Architectures for MPEG-4 Motion Estimation. Author: P. Kuhn (Kluwer Academic Publishers, 1999).

* cited by examiner

*Primary Examiner*—Kanjibhai Patel
(74) *Attorney, Agent, or Firm*—David L Garrison; Garrison & Associates PS

(57) ABSTRACT

A method for motion accounting and compensation while encoding allows improvement of the restored image quality. Image is a predicted frame in video sequence. Motion compensation is understood as an error residual signal compressing scheme, executed during video sequence encoding. According to the teachings of the current invention, errors are accounted for during encoding. Error accounting is subtracting the original image from the predicted frame. The error values are written to the output stream compactly with the minimum code length. The stored error values are added to the predicted frame during the decoding process. The method taught herein is applied for all the predicted frames from the video sequence, thereby allowing one to improve the quality of decompressed video film that was compressed with a significant compression ratio.

1 Claim, 10 Drawing Sheets

FIG.4
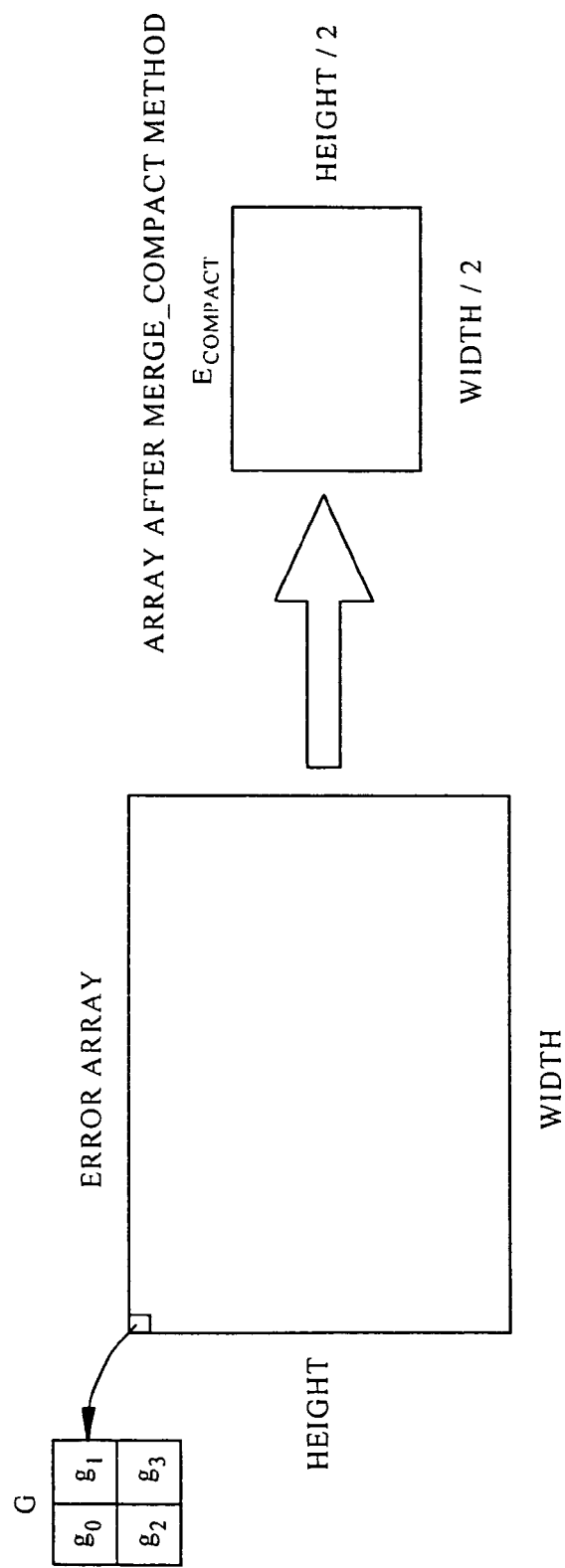
MERGE COMPACT METHOD
ARRAY AFTER MERGE_COMPACT METHOD
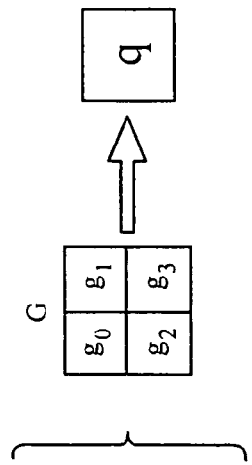
$E_{COMPACT}$ FORMING CONDITIONS:
1. $g_0 = g_1 = g_2 = g_3 = x \Rightarrow q = x$.
2. $g_i > 0, i=\overline{0,3} \Rightarrow q = g_{min}$.
3. $g_i < 0, i=\overline{0,3} \Rightarrow q = g_{min}$.
4. $g_i < 0 \& g_i > 0 \| g_i = 0, i=\overline{0,3} \Rightarrow q = 0$.

FIG. 6 NEW_MERGE_COMPACT METHOD EXAMPLE

FIGURE COVERING METHOD

FIG. 9
GEOMETRIC FIGURE TYPES USED FOR FIGURE COVERING
METHOD AND DATA WRITING ORDER
FIGURE TYPES:
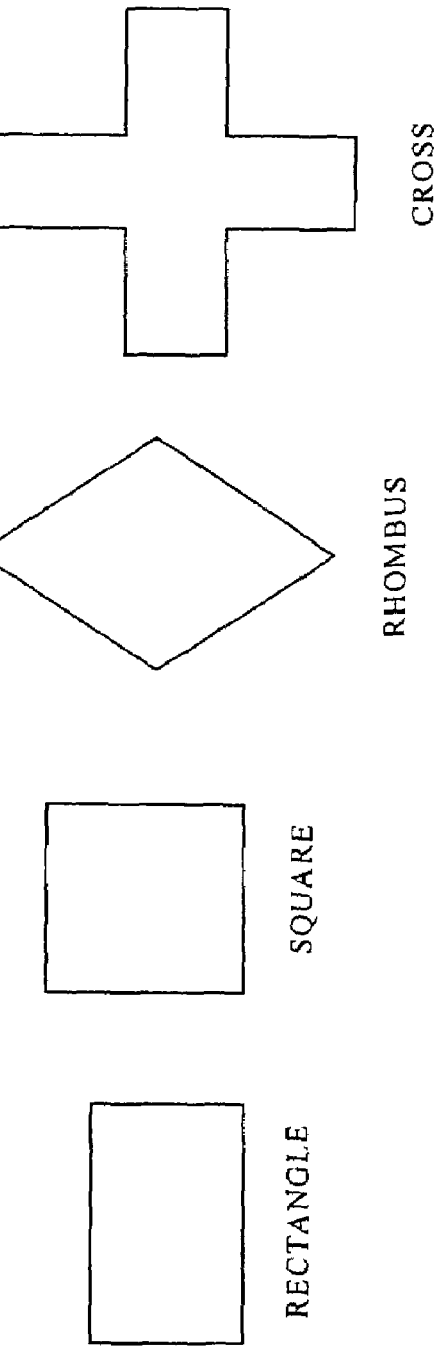
RECTANGLE
SQUARE
RHOMBUS
CROSS
DATA WRITING ORDER:
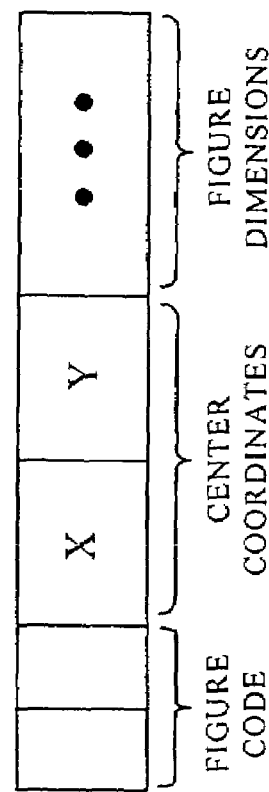
FIGURE CODE
CENTER COORDINATES
X   Y
FIGURE DIMENSIONS

MOTION COMPENSATION METHOD FOR VIDEO SEQUENCE ENCODING IN LOW BIT RATE SYSTEMS

CROSS-REFERENCE TO RELATED APPLICATION

This application claims benefit of Provisional Patent Application No. 60/396,331, filed Jul. 16, 2002, entitled "Motion Compensation Method for Video Sequence Encoding in Low Bit Rate Systems."

FIELD OF INVENTION

The current invention relates to video compression. In particular, the invention relates to motion compensation field for low bit rate compression systems.

BACKGROUND OF THE INVENTION

Video films are an effective means for describing various subjects. Information about the subject is accumulated in video databases. At the present time a great multitude of types of databases have been developed that are oriented to the applications of special methods of analysis and information processing.

Current digital transmitting systems have a number of advantages for video processing in comparison with analog systems. Recently developed techniques have led to improved methods to reduce video or image size. Such methods are extremely useful for digital data storing and processing or manipulating. So it may be said that data size reduction is a compression process. As to the architecture, it is possible now to put a complete compression process into a single chip. The main objective of a compression process is to achieve the highest compression ratio and in the same time to provide the minimum data loss that may lead to decompressed image quality degradation.

SUMMARY OF THE INVENTION

The present invention is better understood upon consideration of following definitions. It is reasonable to perform a video film as a frame sequence. There are a number of frame types that are used to create a frame sequence while encoding or compressing a video film. As used herein, the terms encode and compress are taken to have the same meaning. Similarly, as used herein, the terms decode, restore, and decompress are taken to have the same meaning.

MPEG-1 Defines Four Different Types of Frames.

I-frames (intra-frames) are compressed using intraframe coding; they do not use information from any other frames of the video sequence. This situation is similar to applying Lossy JPEG on individual pictures.

P-frames (predicted frames) are encoded using motion compensated prediction from past I-frames or P-frames. P-frames can be used as reference points for additional motion compensation.

B-frames (bidirectionally predicted frames) provide the highest degree of compression. They are encoded using motion compensated prediction from either past and/or future I-frames or P-frames. B-frames require significantly fewer bits than I- and P-frames.

D-frames are similar to I-frames, but they are encoded using Discrete Cosine Transform (DCT). D-frames are not used in MPEG-2. Therefore, there are three main frame types in MPEG: I-frames, B-frames and P-frames.

The frame stream of the current invention may be described by the following frame types: I-frames, P-frames, reference frames and the current frame.

The current frame is a frame encoded in the present moment of time. The invention disclosed herein uses information from the reference frame to encode the current frame.

Backward-reference frame is a reference frame appearing before the current frame during restoration or decoding.

Forward-reference frame is a reference frame appearing after the current frame during restoration or decoding.

Predicted frame is a frame restored on the basis of a decompression algorithm during encoding but not restoration.

It is sometimes necessary to use frames encoded without using any information from other frames while encoding. Such frames will be referred to herein as Intra frames. The need for intra frames may be conditioned by, for instance, the first scene in a video film or a scenario change that takes place in the film.

Intra-frames require no motion compensation. Therefore, the current invention does not apply motion compensation methods for I-frames.

It is thus an object of the present invention to provide a motion compensation method suitable for various video sequences.

A further object of the present invention is to provide good compression quality, i.e. a high compression ratio with the help of the given motion compensation method.

Another object of the present invention is to improve the P-frames post restoration quality.

The process of computing changes among frames by establishing correspondence between them is called a temporal prediction with motion compensation. The motion compensation process is preceded by motion estimation. In turn the motion estimation process is defined herein as a process of searching corresponding pixels (or blocks of pixels) among frames. The important feature of motion estimation algorithms is that they allow elimination of the temporal redundancy of the video sequence.

Motion estimation methods are based on the fact that the scene of video film does not change radically within $1/25$ to $1/30$ sec. The MPEG motion compensation scheme uses block-based motion compensation scheme to reduce temporal redundancy (i.e., by means of motion compensation, codes of similar blocks can be reduced by referencing them to the image of adjacent frames). The more blocks a frame references, the more similar the adjacent frames are. Therefore, by analyzing the references among encoded frames, their similarities (or dissimilarities) can be determined. For P-frames, after motion estimation, there may be compared two macroblocks—the macroblock from the current frame and the macroblock from the search area of the reference frame. In short two macroblocks are subtracted and their difference is then DCT coded. For B-frames two motion vectors are yielded. The encoder can form a prediction error macroblock from either of two candidate macroblocks or from their average. The prediction error is then encoded using DCT. The quantized DCT coefficients are then encoded using a variable-length coder.

The motion estimation scheme is not a subject of this patent application and the current invention supposes prior implementation of motion estimation procedures. However, it should be noted that motion estimation is needed only for encoding process, but motion compensation is needed for both the encoder and the decoder.

The motion compensation scheme of the current invention comprises the following steps:

Step 1. The prediction error is estimated by subtracting the original frame from the predicted frame and recording the difference in an array.

Step 2. The error array is compressed using the methods below, which are applied according to error values.
  a. Prediction error quantizing,
  a. Error array compressing,
  b. Error array compressing with controlled loss,
  c. Significant area isolating in data array,
  d. Figure covering, and
  e. Topology mask constructing.

Step 3. Prediction error compensation is a process of adding the stored error values to the predicted frame. This is a reverse of the prediction error estimation process.

Step 1 and step 2 are executed during the encoding process, and step 3 is executed during the decoding process.

The current invention presents a motion compensation scheme, comprising of the steps described herein. The invention is better understood upon consideration of the detailed description below and the accompanying drawings.

BRIEF DESCRIPTION OF THE DRAWINGS

FIG. 4 illustrates the MERGE COMPACT method.

FIG. 9 shows the geometric figure types used for error array covering and the order of figure's data writing to the output stream.

BEST MODE OF CARRYING OUT THE INVENTION

Figure 1:
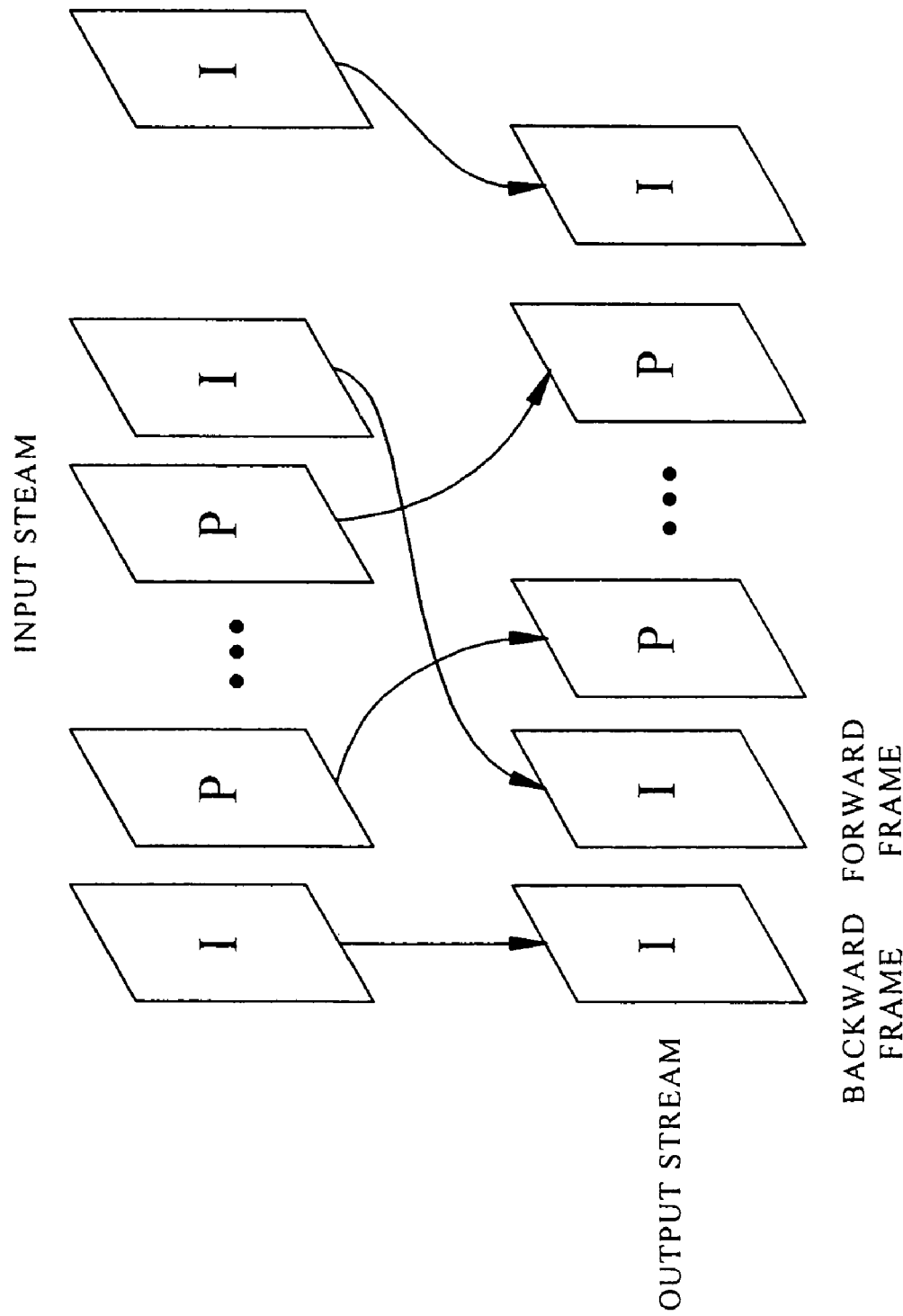
FIG. 1 illustrates the frame sequence in input and output streams.

Turning now to the drawings, the invention will be described in preferred embodiments by reference to the drawing figures.

It is reasonable to perform video as a frame sequence, in turn every frame may be performed as digital matrices. There are some well-known formats for picture representation, such as the RGB model and the YUV model. The RGB model exhibits color as a combination of red, green, and blue. In the YUV model, Y is the color intensity, U is the difference between red and green intensities, and V is the difference between the blue and green intensities.

There exist some models performing YUV standard, one such model is the 4:2:2 model. In this model, the Y-component value is different for every pixel, but the U and V component values are the same for two adjacent pixels, i.e. every intensity value conforms to a pixel; color differences' values are the same for the neighboring horizontal pixels. The table below shows such model.

| $Y_1U_1V_1$ | $Y_2U_1V_1$ |
| $Y_3U_2V_2$ | $Y_4U_2V_2$ |

The most informative component is the Y-component, and the U and V components are much less informative. Moreover it is possible to operate three digital matrices such as Y, U and V components. The current invention will be described using the YUV model.

Figure 3:
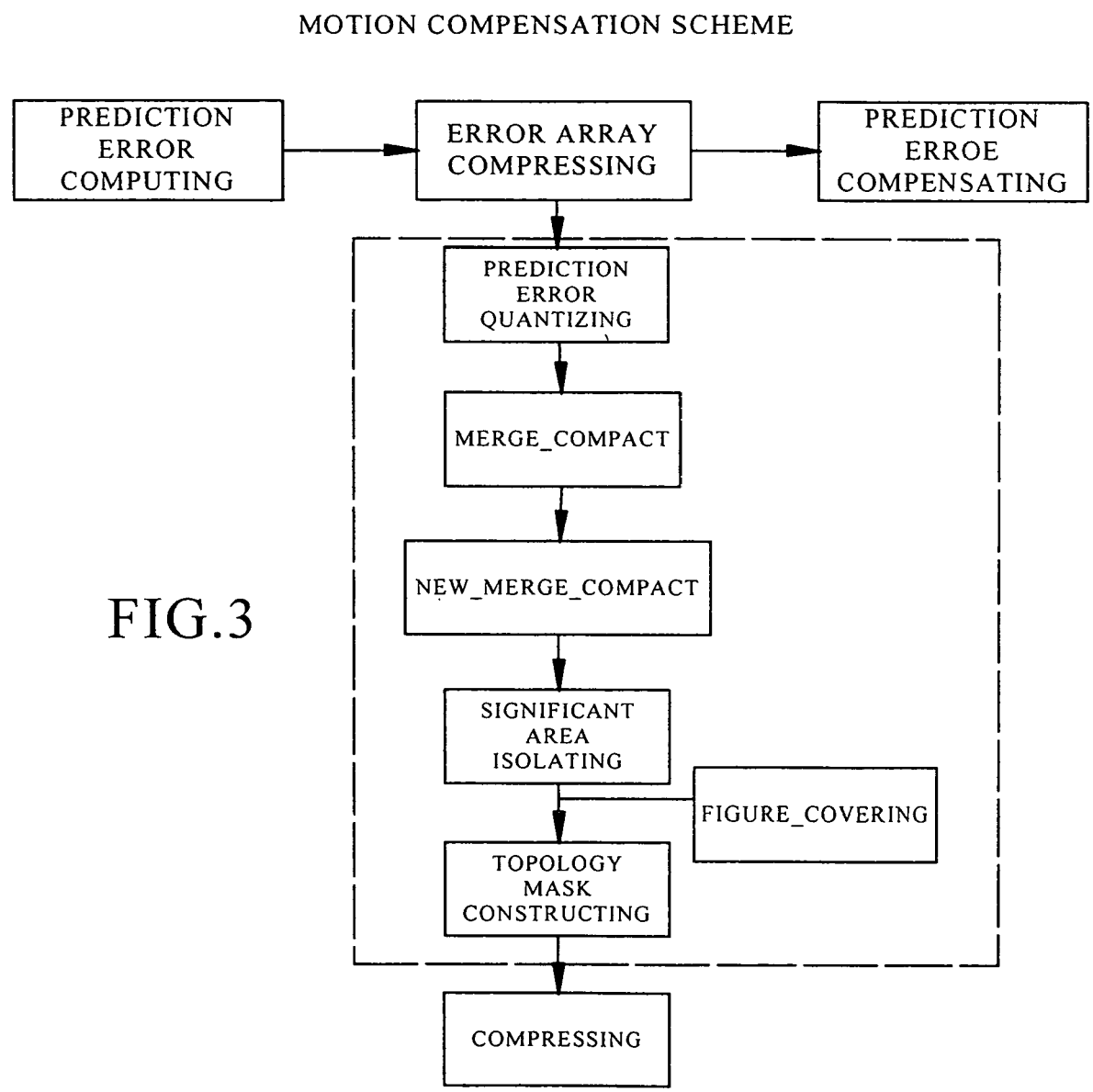
FIG. 3 illustrates the motion compensation scheme.

Referring to FIG. 3, the motion compensation method of the current invention comprises the following steps:

Step 1. Prediction error estimation;

Step 2. Error array compressing, using the methods below (applied according to error values);
  b. Prediction error quantizing,
  c. MERGE COMPACT, (error array compressing),
  d. NEW MERGE COMPACT, (error array compressing with controlled loss),
  e. Significant area isolating in data array,
  f. Figure covering method, and
  g. Topology mask constructing, Step 3. Error compensation, This method is described more fully below. According to the teachings of the present invention, steps 1 and 2 are executed during the encoding process, whereas step 3 is executed during the decoding process.

Figure 2:
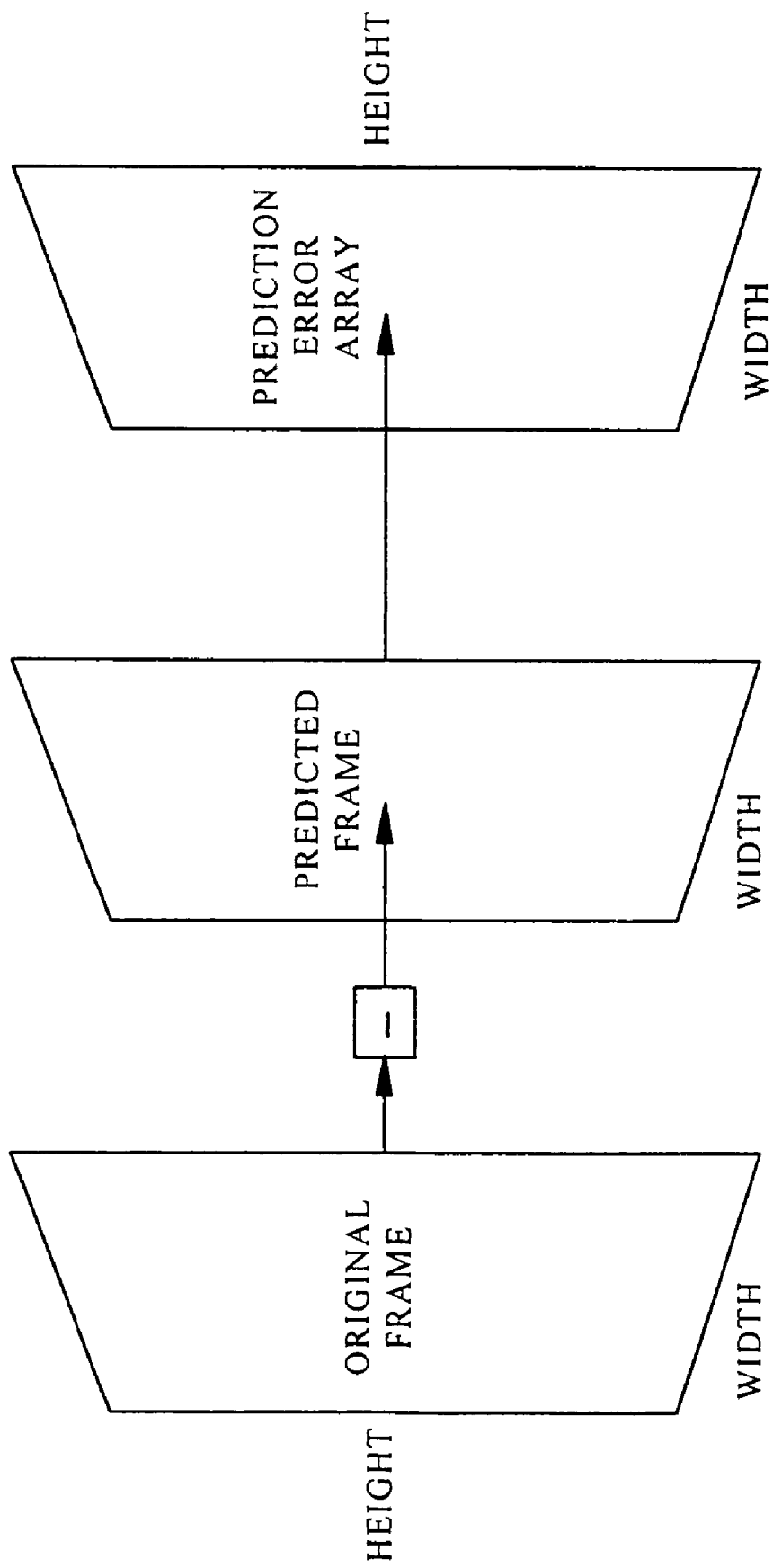
FIG. 2 illustrates the error calculating process.

In the prediction error evaluating process, shown in FIG. 2, the prediction error is computed by subtracting the predicted frame from the original frame and recording the obtained data to the bit stream. Prediction error compensation is the process of adding stored error values to the predicted frame.

The initial data needed for the current motion compensation method are P-frame, O-video sequence original frame, frame width (W) and frame height (H). The motion compensation method of the current invention is then applied for each predicted frame.

Step 1 (Prediction Error Estimation): The first step of the motion compensation method is prediction error estimation (prediction error is the difference between images in the original frame and the motion compensated prediction images in the predicted frame). In this step, the e error is calculated by subtracting P-frame, from the original frame. An array of the error values is then constructed using the equation below:

$$E_{ij} = \frac{(O_{ij} - P_{ij})}{w}; i = \overline{0, H}, j = \overline{0, W}.$$

where $E_{ij}$ is an array containing prediction error values, H is the frame height, W is the frame width, $O_{ij}$ is the original frame in the video sequence, P is a predicted frame, and w is a certain constant.

The constant w, is the pre-processing quantization value. Using this value we can control the quality (accuracy) of compensation work results. It can be chosen in range [1,255]. For best performance, this value is 1 and the value 255 means that the compensation is made only for error values=|255|.

Once obtained, the data in the error array must be stored compactly. The following steps are used to compress the data for compact storage. One purpose of using this method is to get less data loss, because significant losses severely degrade the visual quality of the decompressed images.

Step 2 (Error Array Compression): After the prediction error has been estimated and the error values have been placed in an array, the data in the array is compressed according to the sub-steps (a–f) described below.

a (Error array quantizing): The prediction error estimation yields a sparse matrix performing error array. This data must is now quantized (converted to digital information). The following sub-steps enable one to effectively compact the representation of error values and considerably improve the compression quality of the error array.

b (MERGE COMPACT): After quantizing the error array is still large due to the fact that its dimensions do not change. Additionally, there are a lot of zero elements and uniform values in the error array. The MERGE COMPACT method allows the error data to be compacted to ¼ of its original size.

Referring to FIG. 4, The error array is split into 4×4 element blocks. The number of blocks may vary, based on the size of the error array. Each block is then processed, so that only one element is left. That element is written to the new array. Thus the new array will be ¼ of the size of the error array before the execution of the MERGE COMPACT method. The conditions for choosing an element from the block are illustrated in FIG. 4, and shown below. These conditions are checked sequentially, i.e. check 1, then 2, and so on.

The input and output data for the MERGE COMPACT method is shown in the tables below:

Input Data:

| | |
|---|---|
| E | Input array |
| H | Array height |
| W | Array width |
| G | Block of four elements from E array |
| g | G block element |
| $E_{compact}$ | New array of error data |

Output data:

| | |
|---|---|
| Q | $E_{compact}$ element |

Figure 5:
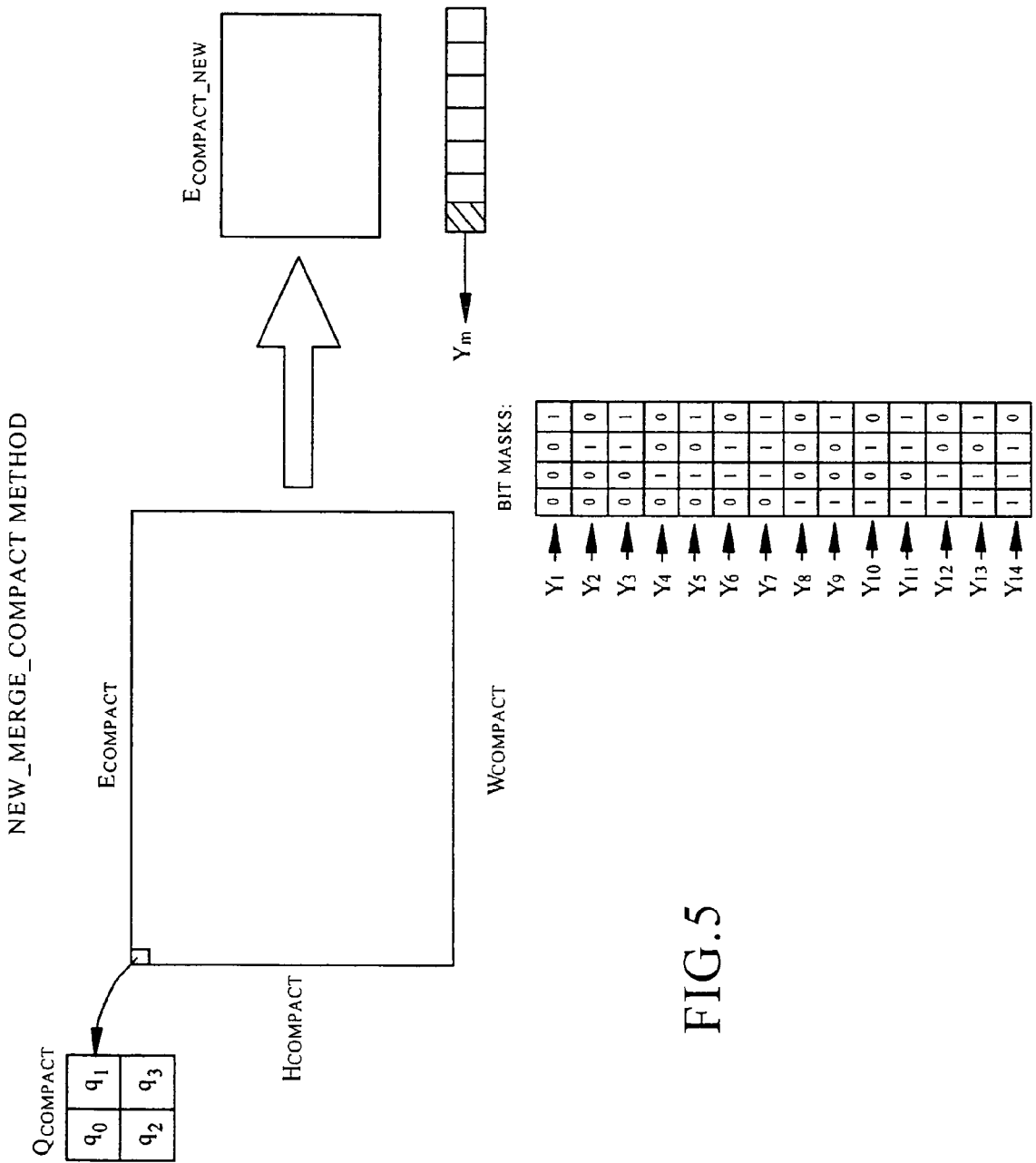
FIG. 5 illustrates the NEW MERGE COMPACT method.

The MERGE COMPACT method is executed according to the following steps:

Step 1. E is split into 4·4 element blocks.
Step 2. Select G block from E array.
Step 3. For every G check the following conditions:
    Step 3.1. If $g_0=g_1=g_2=g_3$, write that element to the $E_{compact}$ array, otherwise, go to the next step.
    Step 3.2. If $g_i>0$, $i=\overline{0,3}$, write $g_{min}$ to the $E_{compact}$ array, otherwise, go to the next step.
    Step 3.3. If $g_i<0$, $i=\overline{0,3}$, write $g_{min}$ in absolute value (i.e. $g_{max}$) to the $E_{compact}$ array, otherwise, go to the next step.
    Step 3.4. If $g_i<0$ and $g_i>0$, or $g_i=0$, $i=0,3$ then write 0 to the $E_{compact}$ array.

c. (NEW MERGE COMPACT): The MERGE COMPACT method reduces the size of the error array, but there is a loss of data inherent in that method. The NEW MERGE COMPACT method allows the size of the error array to be further decreased while controlling the data loss due to the choice of the k parameter (described below). Referring to FIG. 5, this involves splitting the error array obtained after executing the MERGE COMPACT method into 4·4 blocks. One element is then chosen from every block and written to a new array.

The input, output, and local data for the NEW MERGE COMPACT method is shown in the tables below:

Input Data:

| | |
|---|---|
| $E_{compact}$ | Input array |
| $H_{compact}$ | Array height |
| $W_{compact}$ | Array width |
| $Q_{compact}$ | Block containing four elements from $E_{compact}$ array |
| q | $Q_{compact}$ element |
| $E_{compact\_new}$ | New array of error data |

Output Data:

| | |
|---|---|
| $q_{new}$ | $E_{compact\_new}$ element |
| M | Array for bit mask type writing |

Local Data:

| | |
|---|---|
| k | Added value |

Figure 6:
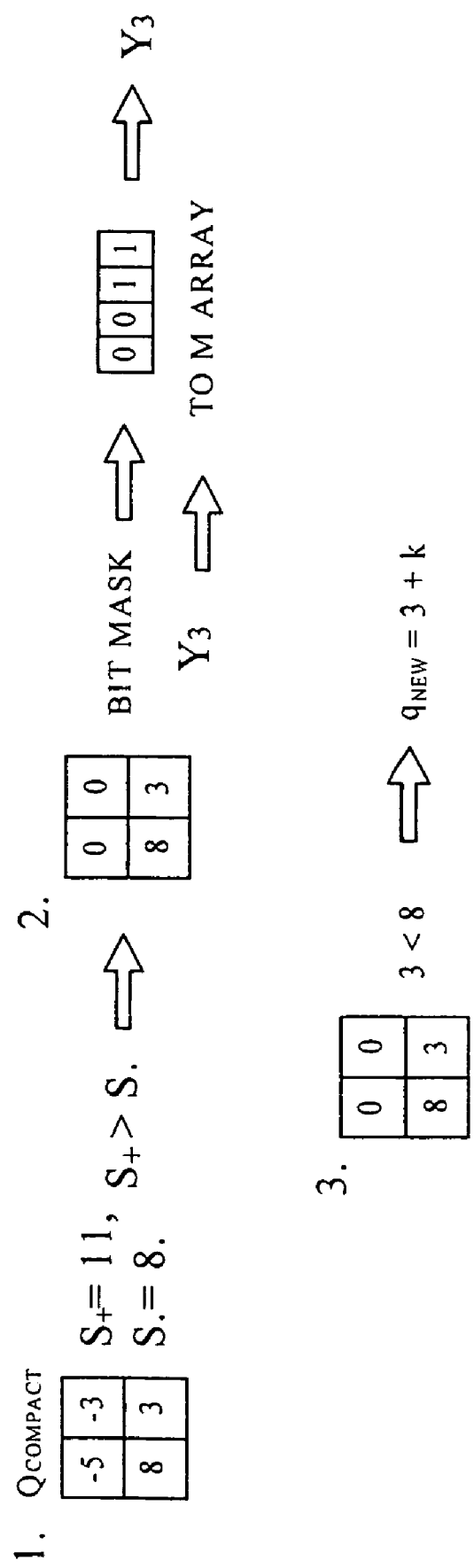
FIG. 6 illustrates an example of the NEW MERGE COMPACT method.

An important aspect of this method is the creation of another array (M) for bit mask number storage. The bit mask number corresponds to the number of elements in the $Q_{compact}$ block from the initial $E_{compact}$ array (i.e., if there are 14 combinations of elements in $Q_{compact}$ block there would be 14 bit masks). During decoding, the bit mask number is read from the M array and elements are restored according to that number. Before choosing bit masks, every block is processed. As illustrated in FIG. 6, and shown below, the conditions for processing the blocks are checked sequentially, i.e. check 1, then 2, and so on.

The NEW MERGE COMPACT method is executed according to the following steps:

Step 1. The $E_{compact}$ array is split into 4·4 element blocks.
Step 2. Select $Q_{compact}$ block from $E_{compact}$ array.
Step 3. For every $Q_{compact}$ check the following conditions:
    Step 3.1. If $q_0=q_1=q_2=q_3$, write that element to $E_{compact}$ array. There's nothing to write to M array. Otherwise go to the next step.
    Step 3.2. If $q_i>0$, $i=\overline{0,3}$, write $q_{min}$ to $E_{compact}$ array so $q_{new}=q_{min}$, otherwise go to the next step.
    Step 3.3. if $q_i<0$, $i=\overline{0,3}$, write $q_{min}$ in absolute value (i.e. $q_{max}$) to $E_{compact}$ array so $q_{new}=q_{max}$, otherwise go to Step 4.

Step 4. Due to the existence of either positive or negative elements in the $E_{compact}$ array (step 3.3 above), proceed with the following steps:
    Step 4.1. Calculate the power of positive and negative elements:

$$S_+ = \sum_{i=0}^{3} q_i, \; q_i > 0.$$

-continued $$S_- = \sum_{i=0}^{3} |q_i|, q_i < 0.$$

Step 4.2. Compare $S_+$ and $S_-$:
  If $S_+ > S_-$, $q_i < 0$ are set to zero.
  If $S_+ < S_-$, $q_i > 0$ are set to zero.
Step 4.3. Choose the element combination number ($Y_m$) according to the allocation of the in the block. Element combination is performed with a bit mask; if an element is not a zero, the corresponding bit is set to 1.

Bit masks are shown in the table below:

| $Q_{compact}$ block elements | | | | Number of combination ($Y_m$, |
|---|---|---|---|---|
| $q_0$ | $q_1$ | $q_2$ | $q_3$ | m = $\overline{1, 14}$) |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |

Step 4.4. Choose the element to write to $E_{compact\_new}$ array.
  If $q_i > 0$, choose the minimal $q_i$.
  If $q_i < 0$, choose the minimal $q_i$ in absolute value.
Step 5. The found $q_i$ value is increased by the value of k, so $q_{new} = q_i + k$. The value of k is determined according to previous quantizing step (w). The value k is used to make the resulting stream more uniform. Thus, result values must have more uniform view with different w values and is usually calculated as k–64–256/w. The value 64 is chosen empirically, and is used like the correcting value for max error values distribution.

d (Significant area isolating method): Significant area isolating is used to cut off the outermost rows and columns of the data array after executing the previous methods. Under the assumption that there are a lot of zero elements in external rows and columns of the data array, the external array areas are checked.

It is extremely important to save nonzero elements during this stage of the error residual signal-encoding scheme.

Figure 7:
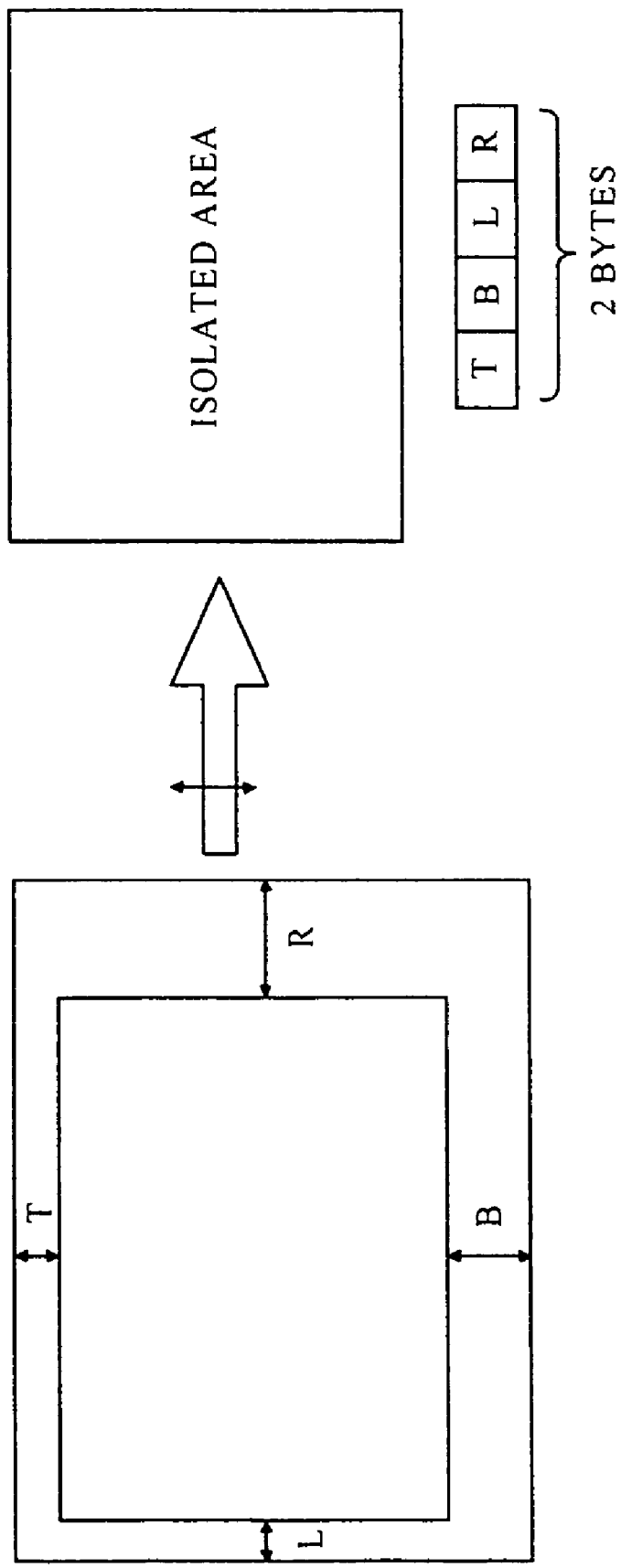
FIG. 7 illustrates the method for significant area isolating in error array.

Referring to FIG. 7, the outermost rows and columns are cut off according to the predefined threshold Tr, which is sufficiently small. This threshold value range is [0,min (Height,Width)]. But in practice it must be small. The value of Tr will vary depending on image size, and can be chosen like min(Height,Width)/200 (200 here is an empirically chosen value). When this threshold value is 1 there is no quality loss. The cut rows and columns are supplemented by zeros and the number of cut rows and columns are recorded to the output stream. The isolated area is stored in the central error data array. The input, output, and local data for the significant area isolating method is shown in the tables below:

Input Data:

| | |
|---|---|
| $E_{compact\_new}$ | Input array |
| $H_{compact\_new}$ | Array height |
| $W_{Compact\_new}$ | Array width |

Output Data:

| | |
|---|---|
| T | Number of rows cut from the top of $E_{compact\_new}$ array |
| B | Number of rows cut from the bottom of $E_{compact\_new}$ array |
| L | Number of columns cut from the left side of $E_{compact\_new}$ array |
| R | Number of columns cut from the right side of $E_{compact\_new}$ new array |

Local Data:

| | |
|---|---|
| Tr | Threshold |
| Z | Number of zero elements in outermost row or column |
| N | Number of nonzero elements in outermost row or column |

The significant area isolating method is executed according to the following steps:
  Step 1. Determine the number of outermost rows and columns in $E_{compact\_new}$ array.
  Step 2. If N<Tr, in a particular row or column, cut the row or column and go to the next step, otherwise the row or column is not cut off. Go to Step 1.
  Step 3. Write the T, B, L and R values to the output stream.
  e (Figure covering method): The major task of the current motion compensation method is to write error values compactly to the output stream. The array obtained after executing the preceding methods is sufficiently sparse in that it will contain a lot of zeros. Therefore, it is reasonable to isolate areas containing zero elements, and doing so will allow one to compactly write error values to the output stream.

Figure 8:
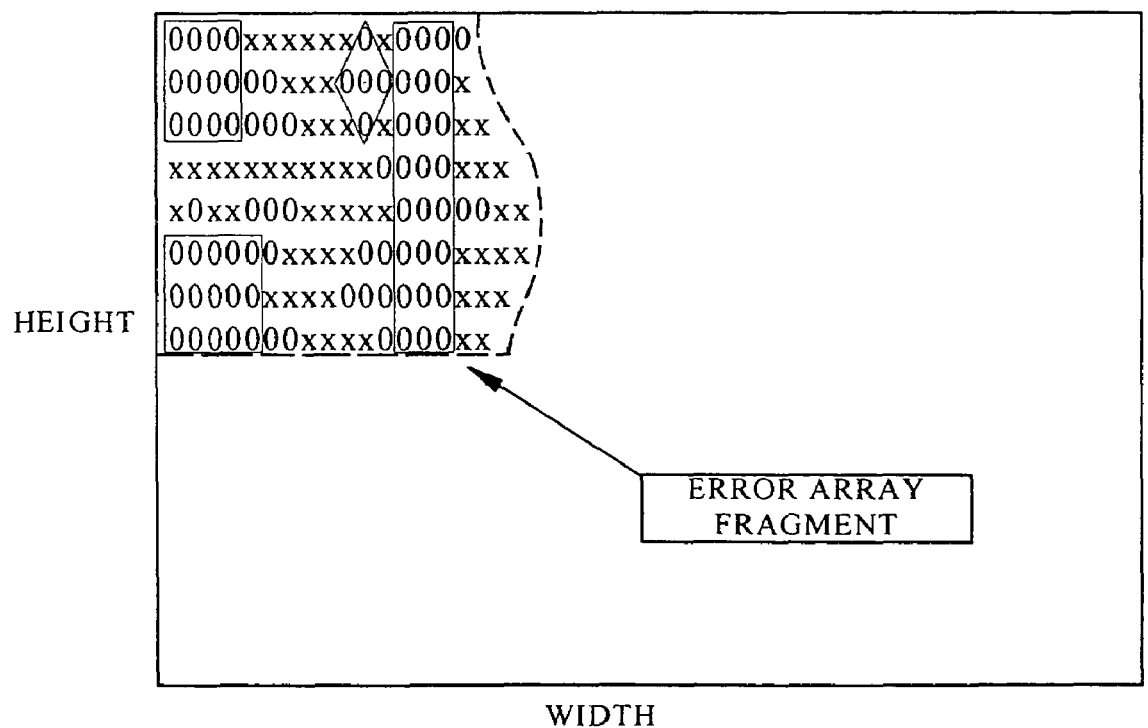
FIG. 8 illustrates the figure covering method.

The compact data representation is achieved by error data array compressing. One of the steps for error array processing is a method of covering the error array with geometric figures that isolate uniform areas. The figure covering method is illustrated in FIG. 8.

For every array element, the largest possible geometric figure that contains only zero components is constructed. By using the minimum number of figures to cover the largest possible area, large portions of the entire array may be covered. The types of figures used are shown in FIG. 9. Each figure is chosen from the list of figures, so that every figure has a proper code (number). The figure code, shown in the table below, is written in two bits:

| Figure type | Figure code |
|---|---|
| Square | 00 |
| Rectangular | 01 |

-continued

| Figure type | Figure code |
|---|---|
| Rhombus | 10 |
| Cross | 11 |

Additionally, there is a threshold for the number of elements in a geometric figure. According to the teachings of the current invention this threshold is defined relative to picture (frame) dimensions and correspondingly to error array dimensions and zero elements number. The P threshold is dependant on figure size and its proportion to the size of the image. It is important to save only big figures, because small images cannot provide gains in compression or compensation signal. In practice, if the size of the figure is more than 6–10 percent of the image size, and the number of zero elements in this figure is above 98 percent, the figure is saved. The input and output parameters, and local data used for figure covering are shown in the tables below:

Input Parameters:

| | Input array |
|---|---|
| H | Array height |
| W | Array width |
| P | Minimal elements number threshold |
| $a_{ij}$ | Input array element |

Output Parameters:

| | Output stream of figures |
|---|---|
| Len | Array without cut figures array length |

Local Data:

| | |
|---|---|
| $p^*$ | Figure number in the best combination (i.e. minimal number of covering figures) |
| $f^*$ | Number of points, covered by $p^*$ (i.e. maximum number of elements) |
| p | Number of error array elements in the given figure combination |
| f | Number of figures for the given combination. |

The Figure covering method is executed according to the following steps:

(A) For every error array element and for every type of figure, the following steps (1–3) of the Figure covering method are executed:

Step 1. If $a_{ij}=0$ attempt to construct the largest figure containing just zero elements around that element. The figure construction is verified by checking neighbor elements. If the element from the area checked is zero, it is included in the figure constructed around $a_{ij}$, and step 2 is performed otherwise go to Step 3.

Step 2. If $_p \geq 1$, the given figure is written to the list of figures. The figure data writing process is illustrated in FIG. 9.

Step 3. Repeat process with all other $a_{ij}$ elements.

A list of figures covering the areas of error array that contain only zeros is generated by this method. Because different figure combinations are possible, it is important to choose the best combination. The best figure combination is determined according to the largest area covered and the least quantity of figures in a given array. The smaller the number of figures the higher the degree of compression. If is the best combination of figures, it can be determined using the method below.

(B) For all combinations of figures the following steps (4–8) of the Figure covering method are executed:

Step 4. Calculate the number of elements $(_p)$, covered by the given combination of figures containing of $_f$ figures.

Step 5. If the given combination of figures is greater than *, meaning that $_p>_p*$ and $_f<_f*$, the given combination becomes the current one, i.e. we choose given combination.

Step 6. Switch to the next combination and repeat steps 4 and 5.

Step 7. The best combination is written to output stream.

Figure 10:
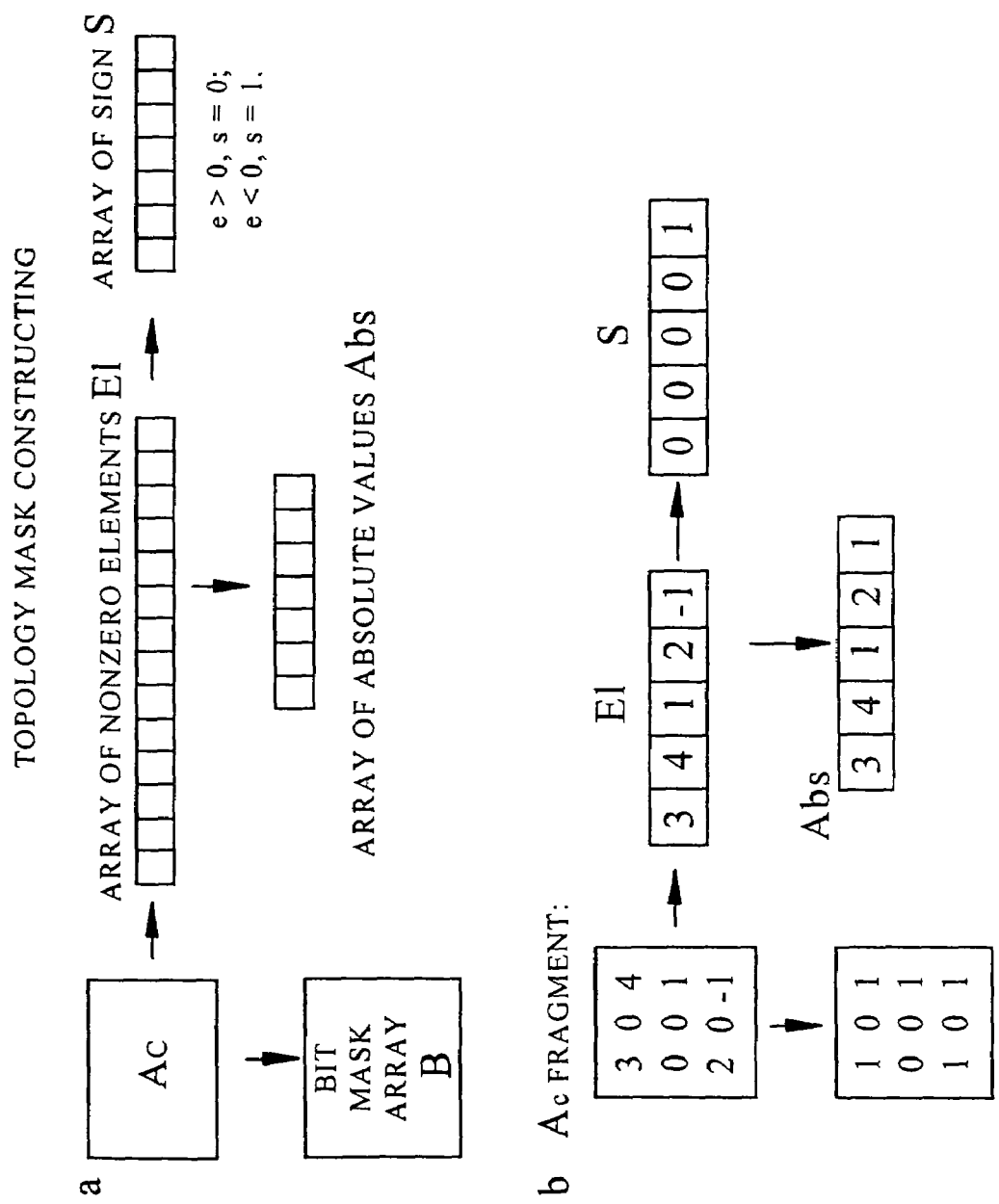
FIG. 10 illustrates the method for topology mask constructing.

Step 8. Cut all the figures from the array, to obtain an array having Len length.

f (Topology mask constructing): The final stage of the encoding process is a method for topology bit mask constructing. This method is illustrated in FIG. 10. The topology bit mask reflects the allocation of nonzero elements in a data array. The object is to separate the element's values and their allocation in a data array (i.e. topology).

The $A_c$ array is separated into two new arrays, a bit mask array (B) and an array containing the values of the nonzero elements (El). The El array is then separated into two arrays, an array containing the absolute values of elements (Abs) and an array of the element's signs (S). The second array (S) is a bit array, so if an element is positive, write 0 to that array, otherwise write 1:

$$e>0, s=0;$$

$$e<0, s=1.$$

After separation, the resulting arrays are encoded using run-length-encoding technique. The input and output parameters for constructing topology masks are shown in the tables below.

Input Parameters:

| | |
|---|---|
| c | Input array |
| B | Bit mask array |
| El | Array containing nonzero elements values |
| e | El array element |
| Abs | Array of elements absolute values |
| S | Array containing elements signs |
| s | S array element |

Output parameters:

| | |
|---|---|
| B* | Compressed B array |
| Abs* | Compressed Abs array |
| S* | Compressed S array |

Prediction error compensating: Prediction error compensation is the process of adding the stored error values to the predicted frame. This is a reverse process to the prediction error evaluating process, and it is completed during the decoding process.

The current invention allows one to compress data related to motion compensation in compressed video. If data array elements are compacted in accordance to the teachings of this invention, compressed video may be replayed without any loss of the data and without severe degradation of the video quality.

The current invention discloses methods and procedures for motion compensation in video compression. The methods and procedures disclosed in the current application can be executed or preformed in a computer, other microprocessors, programmable electronic devices or other electronic circuitry that are used for encoding video film. They can be loaded into the above devices as software, hardware, or firmware. They can be implemented and programmed as discrete operations or as a part of a larger video compression strategy.

INDUSTRIAL APPLICABILITY

In compliance with the statute, the invention has been described in language more or less specific as to structural features. It is to be understood, however, that the invention is not limited to the specific features shown or described, since the means and construction shown or described comprise preferred forms of putting the invention into effect. Additionally, while this invention is described in terms of being used to provide a method of motion compensation for compressed video data, it will be readily apparent to those skilled in the art that the invention can be adapted to other uses as well. The invention should not be construed as being limited to motion compensation and is therefore, claimed in any of its forms or modifications within the legitimate and valid scope of the appended claims, appropriately interpreted in accordance with the doctrine of equivalents.

What is claimed is:

1. A method of motion compensation for a video sequence having an original frame and a plurality of predicted frames comprising the steps of:

a. selecting a predicted frame from the plurality of predicted frames;
   b. calculating the prediction error for the predicted frame;
   c. placing the error data in an error data array;
   d. converting the error data array into a digital format;
   e. splitting the error data array into four by four element blocks;
   f. determining the value of each four by four element block in the error data array;
   g. placing the value of each four by four element block from the error data array into a compact error data array;
   h. splitting the compact error data array into four by four element blocks;
   i. determining the bit mask number for each four by four element block in the compact error data array;
   j. placing the bit mask number into a bit mask number array;
   k. determining the value of each four by four element block in the compact error data array;
   l. placing the value of each four by four block from the compact data array into a new compact data array;
   m. removing all of the outermost rows and columns of the new compact data array that contain only zero elements;
   n. selecting geometric figures from group of geometric figures having pre-defined values;
   o. constructing the geometric figures around the largest possible areas in the new compact error data array that contain only zero elements;
   p. determining the smallest combination of geometric figures to use for the new compact error data array;
   q. recording the figure value, the center coordinates of the figure, and the figure dimensions into a figure data array;
   r. removing all zero elements that are covered by a geometrical figure from the new compact data array
   s. separating the new compact data array into a B array, which is a bit array that reflects the allocation of non zero elements in the new compact data array, and an El array that contains the values of non zero elements in the new compact data array;
   t. separating the El array into an Abs array that contains the absolute value of the elements in the El array and an S array, which is a bit array that contains the sign of the elements in the El array;
   u. encoding the B array, the Abs array, and the S array using run-length-encoding techniques;
   v. decoding the arrays; and
   w. compensating for the predicted error while the arrays are decoded by adding the stored prediction error values to the predicted frame.

* * * * *